(12) United States Patent
Chang

(10) Patent No.: US 10,809,441 B2
(45) Date of Patent: Oct. 20, 2020

(54) OPTICAL INDICATING STRUCTURE

(71) Applicants: Sintai Optical (Shenzhen) Co., Ltd., ShenZhen, Guandong Province (CN); Asia Optical Co., Inc., Taichung (TW)

(72) Inventor: Chia-Kan Chang, Taichung (TW)

(73) Assignees: SINTAI OPTICAL (SHENZHEN) CO., LTD., Shenzhen, Guangdong Province (CN); ASIA OPTICAL CO., INC., Taichung (TW)

( * ) Notice: Subject to any disclaimer, the term of this patent is extended or adjusted under 35 U.S.C. 154(b) by 199 days.

(21) Appl. No.: 16/115,670

(22) Filed: Aug. 29, 2018

(65) Prior Publication Data

US 2019/0072706 A1 Mar. 7, 2019

(30) Foreign Application Priority Data

Sep. 6, 2017 (CN) .......................... 2017 1 0796946

(51) Int. Cl.
*F21V 8/00* (2006.01)
*G02B 27/34* (2006.01)
*G02B 6/35* (2006.01)

(52) U.S. Cl.
CPC ........... *G02B 6/0036* (2013.01); *G02B 6/003* (2013.01); *G02B 6/006* (2013.01); *G02B 6/0021* (2013.01); *G02B 6/353* (2013.01); *G02B 27/34* (2013.01)

(58) Field of Classification Search
CPC . G01D 3/00; G01D 7/00; G01D 11/28; G12B 11/00; F21Y 2101/00; F21Y 2103/10; F21Y 2115/10; G02B 6/0036; G02B 6/0021; G02B 6/006; G02B 6/003; G02B 6/353; G02B 27/34; G02B 23/00; G09F 13/00; G09F 13/18

See application file for complete search history.

(56) References Cited

U.S. PATENT DOCUMENTS

| | | | | |
|---|---|---|---|---|
| 6,422,710 | B1 * | 7/2002 | Herzog .................. | B60K 37/02 362/23.1 |
| 2009/0196013 | A1 * | 8/2009 | Mezouari ............... | G01D 13/28 362/23.2 |
| 2010/0033311 | A1 * | 2/2010 | Tominaga ............... | G01D 11/28 340/425.5 |
| 2017/0351127 | A1 * | 12/2017 | Masuda ............ | G02F 1/133615 |
| 2017/0351143 | A1 * | 12/2017 | Kadowaki ............ | G02B 6/0068 |

\* cited by examiner

*Primary Examiner* — Joseph L Williams
*Assistant Examiner* — Jose M Diaz
(74) *Attorney, Agent, or Firm* — McClure, Qualey & Rodack, LLP

(57) ABSTRACT

An optical indicating structure includes a light guiding element and a light source. The light guiding element includes a protruding portion, a light exit surface and a light incident surface, wherein the light exit surface is formed on the protruding portion. The light source is configured to emit a light beam, wherein the light beam enters the light guiding element through the light incident surface and leaves the light guiding element through the light exit surface to be an indicating sign.

19 Claims, 10 Drawing Sheets

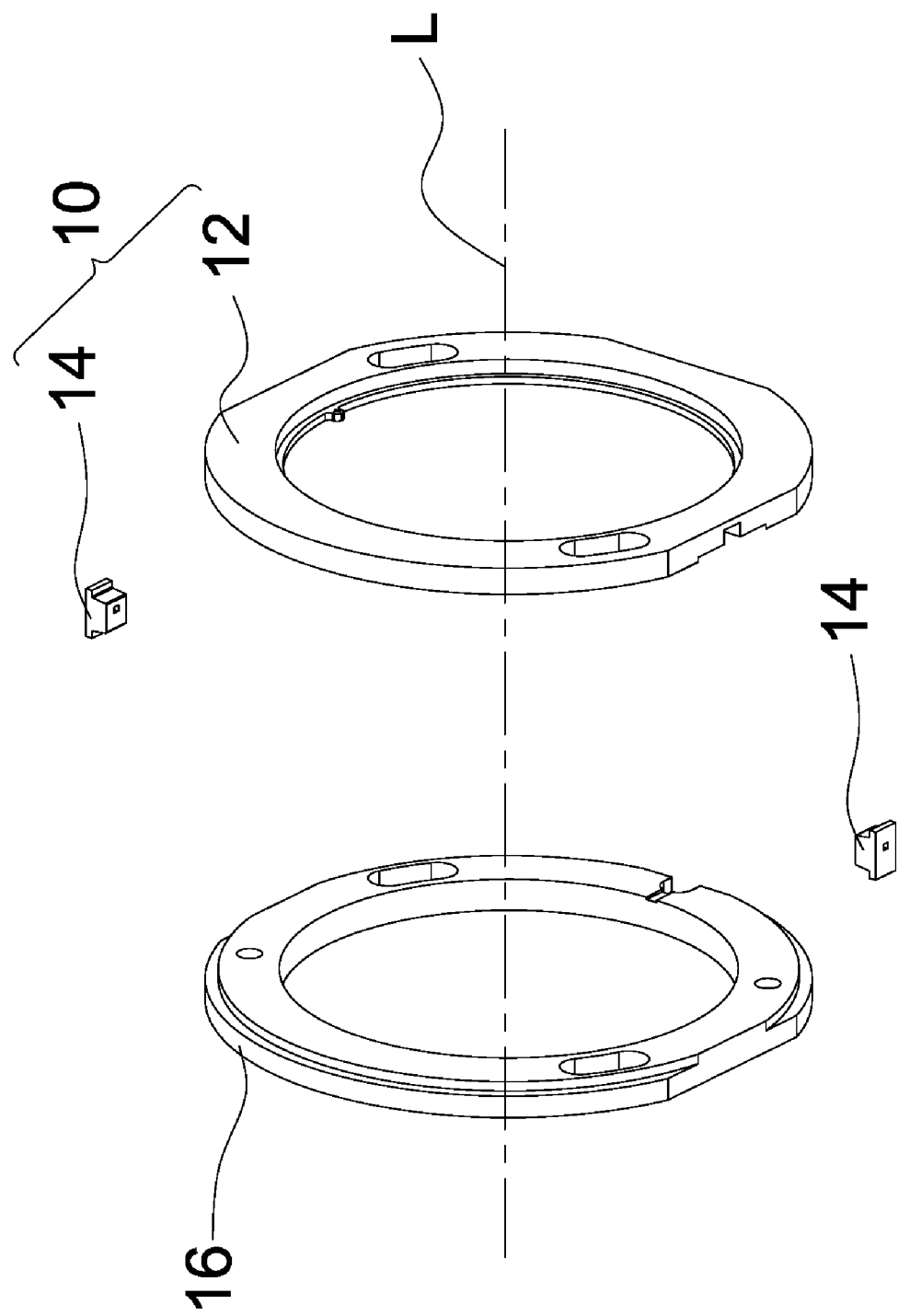

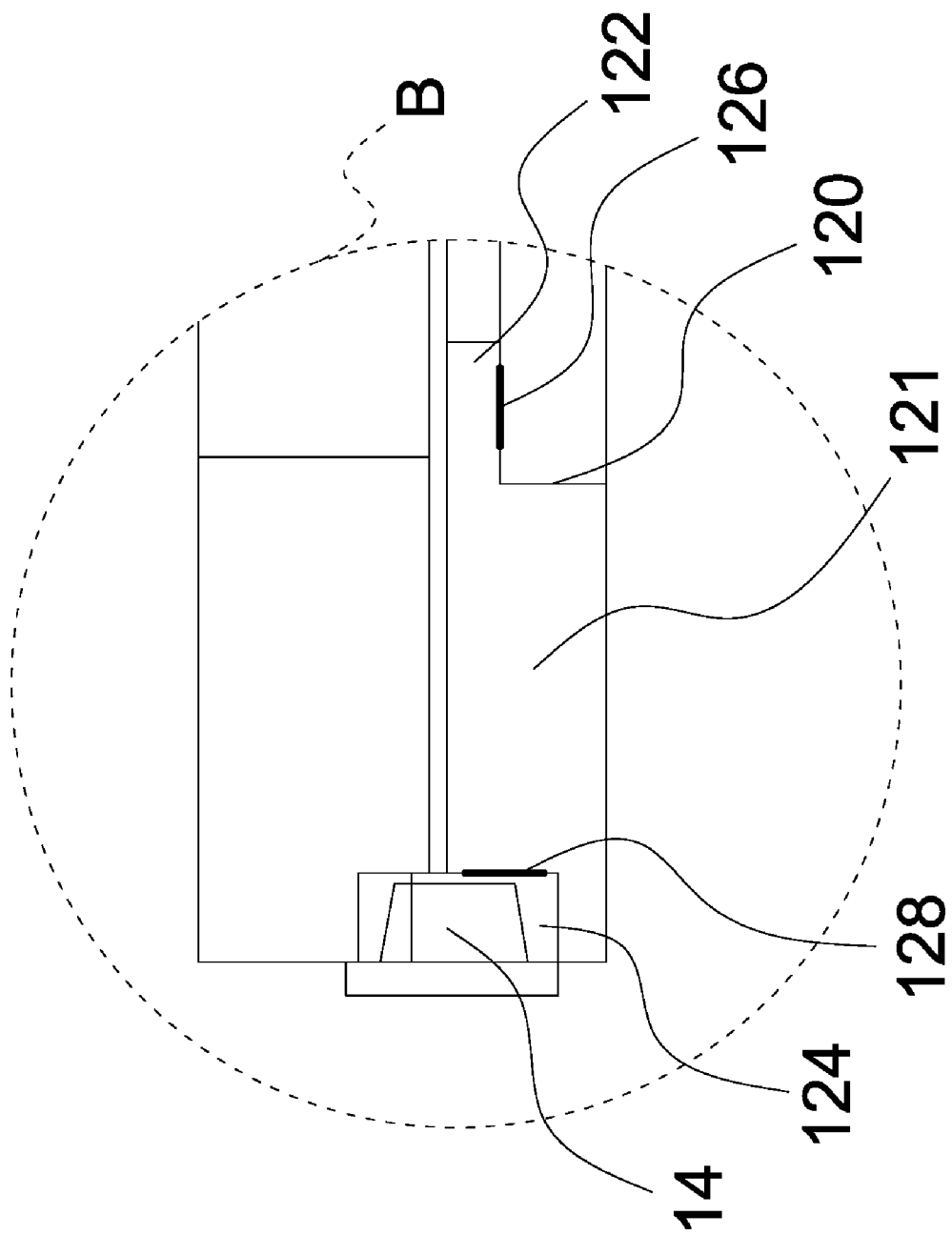

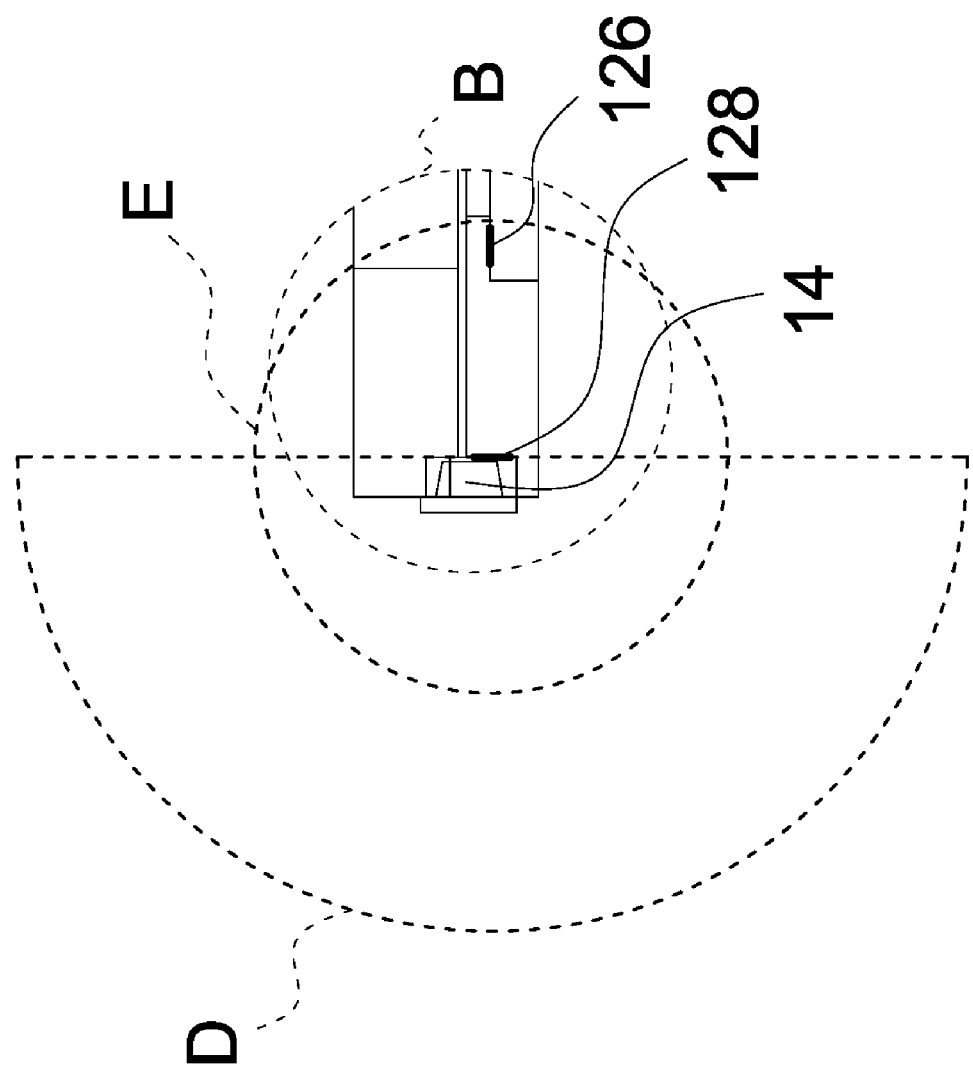

OPTICAL INDICATING STRUCTURE

BACKGROUND OF THE INVENTION

Field of the Invention

The invention relates to an optical indicating structure, and more particularly to an optical indicating structure having a light guiding element.

Description of the Related Art

Referring to FIGS. 1A and 1B, a prior optical indicating structure 1, usually disposed within an aiming apparatus (not shown), includes an annular shade 3 and two light sources (not shown). When a user makes an observation through the aiming apparatus, an object (such as flower), a reticle and a portion of the optical indicating structure 1 are visible within a visual field 7 provided for the user, wherein the boundary of the visual field 7 is represented by a broken line in FIG. 1A. As shown in FIG. 1B, the annular shade 3 includes a protruding portion 31 and a through hole 33, wherein the protruding portion 31 (that is, the above-described portion of the optical indicating structure 1) is visible within the visual field 7 and is provided with the through hole 33. The light source is disposed at a side of the protruding portion 31 opposite to the user (from the user's view, the side is right behind the protruding portion 31) to emit a light beam. The light beam passes through the through hole 33 and travels to eyes of the user. As a result, the user feels that the through hole 33 emits light.

In above-described structure, the light source is required to be disposed right behind the protruding portion 31 so that the light beam can pass through the through hole 33 to the eyes of the user. In addition, the protruding portion 31 is required to be sufficiently large for shielding the light source, so as to prevent the light source from appearing within the visual field 7 (therefore, the light source is invisible in FIGS. 1A and 1B). Generally, a ratio of an area of the visual field 7 to an orthographic projection area of the protruding portion 31 (excluding an orthographic projection area of the through hole 33) is approximately 80.02.

BRIEF SUMMARY OF THE INVENTION

The invention provides an optical indicating structure including a light guiding element. The light guiding element is configured to transmit a light beam emitted by the light source for substituting the prior annular shade, so that the light source can be disposed without constraint.

An optical indicating structure in accordance with an embodiment of the invention includes a light guiding element and a light source. The light guiding element includes a protruding portion, a light exit surface and a light incident surface, wherein the light exit surface is formed on the protruding portion. The light source is configured to emit a light beam, wherein the light beam enters the light guiding element through the light incident surface and leaves the light guiding element through the light exit surface to be an indicating sign.

In another embodiment, the light guiding element further includes a main body, the protruding portion extends from an inner circumferential surface of the main body, and the light incident surface is formed on the main body.

In yet another embodiment, further including an opaque layer which is formed to cover entirety of the light guiding element except the light incident surface and the light exit surface.

In another embodiment, the light guiding element further includes a recess formed on the main body, and the light incident surface is formed in the recess.

In yet another embodiment, the light source is disposed in the recess.

In another embodiment, the protruding portion is visible within a visual field when the optical indicating structure is observed in a direction towards the light exit surface.

In yet another embodiment, the light exit surface is formed within a spherical region which has a predetermined diameter and a sphere center coinciding with a center of the light incident surface, to maintain brightness of the light beam at a predetermined extent after the light beam is repeatedly reflected within the light guiding element and to ensure that the light beam leaves the light guiding element through the light exit surface.

In another embodiment, a visual field is visible when the optical indicating structure is observed in a direction towards the light exit surface, and the light beam is different in color from the visible field.

In yet another embodiment, the light source is disposed within a half spherical region which has a predetermined radius and a sphere center coinciding with a center of the light incident surface, to ensure that the light beam enters the light guiding element from the light incident surface.

In another embodiment, the light source emits the light beam at a first frequency or a second frequency so that the light beam, when leaving the light guiding element, is configured to be a first indicating sign or a second indicating sign different from the first indicating sign.

In yet another embodiment, the light source emits the light beam with a first color or a second color so that the light beam, when leaving the light guiding element, is configured to be a first indicating sign or a second indicating sign different from the first indicating sign.

An optical indicating structure in accordance with another embodiment of the invention includes an ocular lens, an objective lens, a light guiding element and a light source. The light guiding element is disposed between the ocular lens and the objective lens, wherein the ocular lens, the light guiding element and the objective lens constitute an optical path. The light guiding element includes a main body, a protruding portion, a light exit surface and a light incident surface. The main body includes an inner circumferential surface surrounding a space, the space is disposed in the optical path, and the light exit surface is formed on the protruding portion. The light source is configured to emit a light beam, wherein the light beam enters the light guiding element through the light incident surface, leaves the light guiding element through the light exit surface and travels towards the ocular lens to be an indicating sign.

In another embodiment, the protruding portion extends from the inner circumferential surface, the light incident surface is formed on the main body and is not parallel to the optical path, and the optical path is parallel to a direction in which the light beam leaves from the light exit surface.

In yet another embodiment, a visual field is visible when the optical indicating structure is observed in a direction towards the light exit surface, and a ratio of area of the visual field to area of the protruding portion ranges from 400 to 450.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 2 is an exploded view of an optical indicating structure in accordance with an embodiment of the invention;

FIG. 3B is an enlarged view of portion B of FIG. 3A;

FIG. 5 is an enlarged view of portion B of FIG. 3A;

DETAILED DESCRIPTION OF THE INVENTION

Figure 1A:
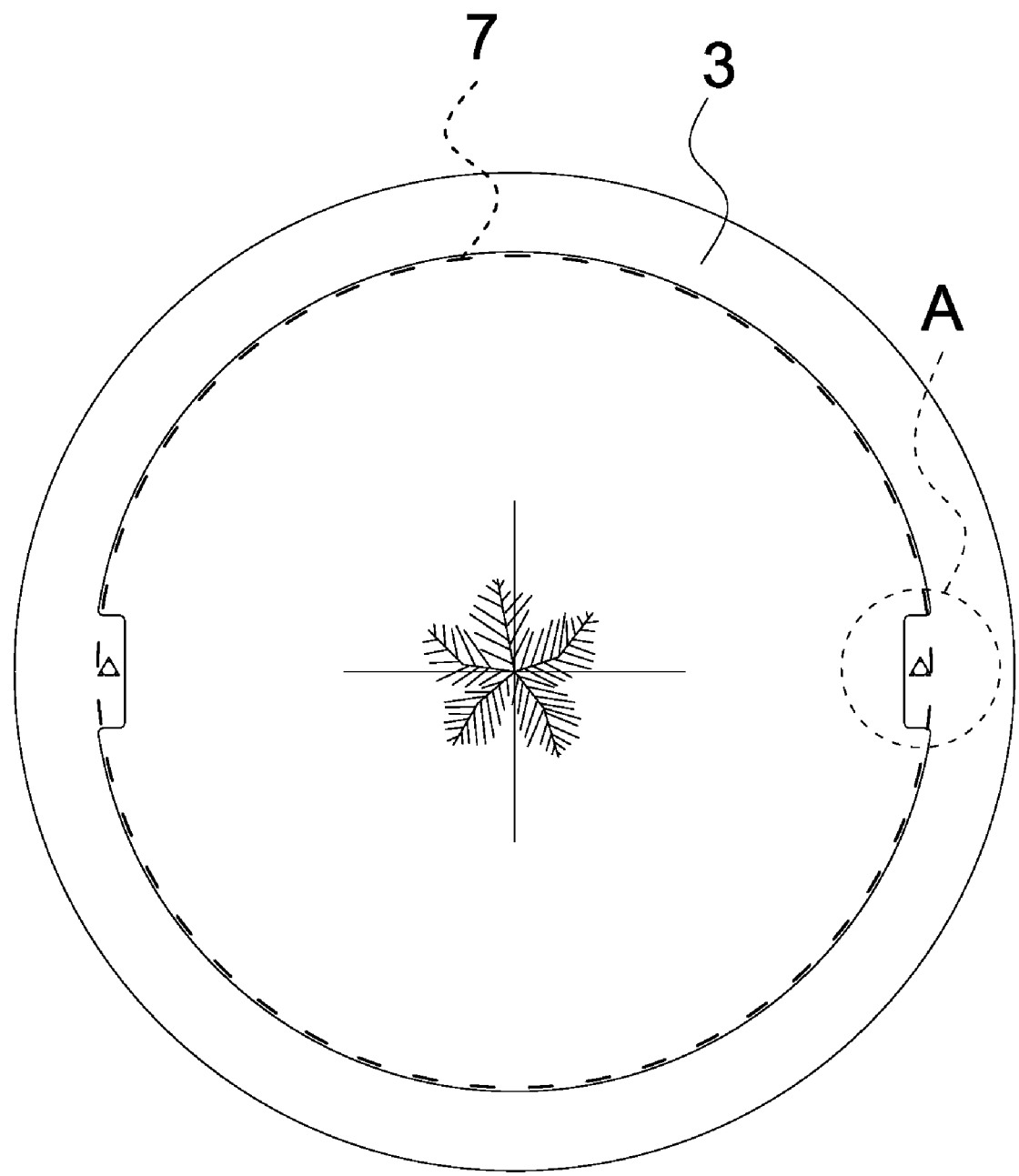
FIG. 1A is a front view of a prior optical indicating structure.
Figure 1B:
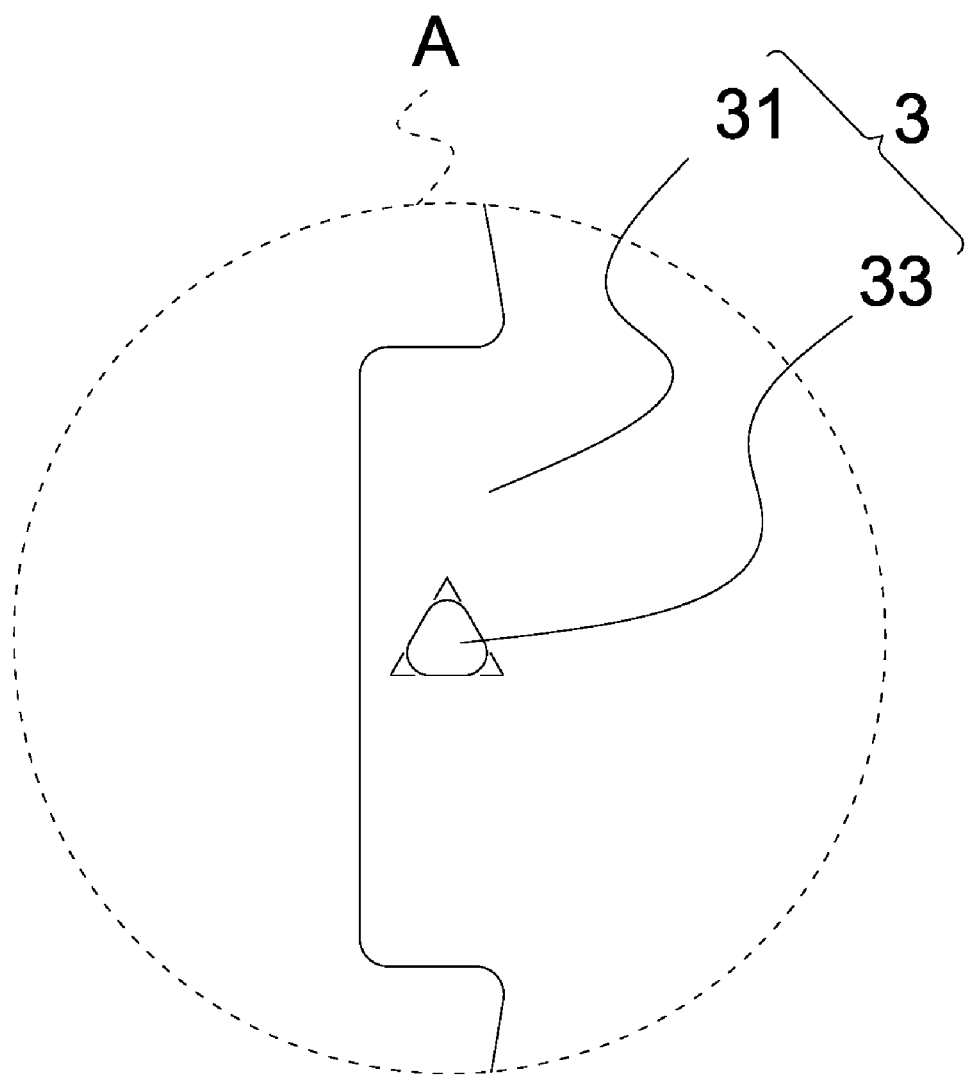
FIG. 1B is an enlarged view of portion A of FIG. 1A.
Figure 3A:
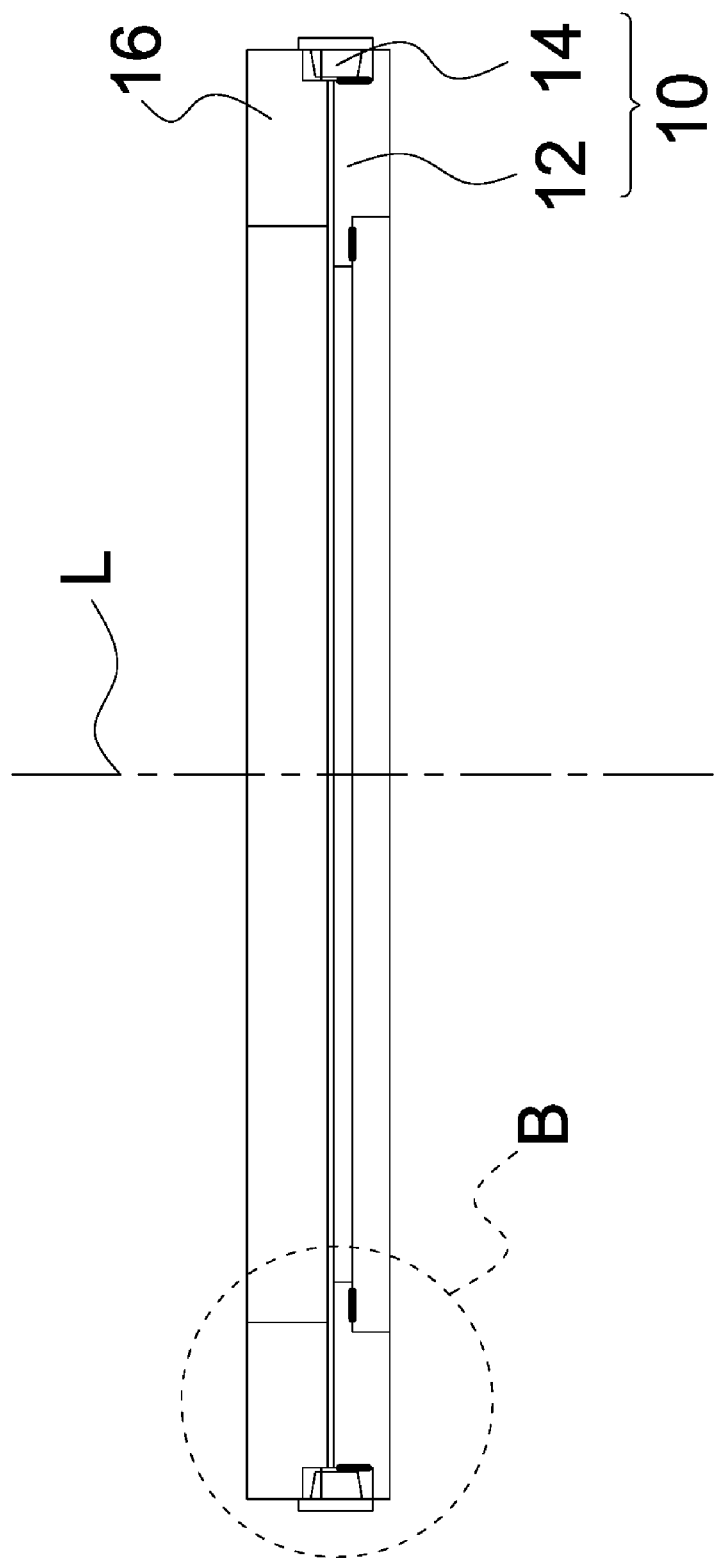
FIG. 3A is a sectional view of the optical indicating structure of FIG. 2.

Referring to FIGS. 2, 3A and 3B, an optical indicating structure 10 in accordance with an embodiment of the invention includes a light guiding element 12 and two light sources 14. The optical indicating structure 10 is disposed within an aiming apparatus (not shown), and the aiming apparatus includes an objective lens (not shown) and an ocular lens (not shown). The optical indicating structure 10 is disposed between the objective lens and the ocular lens and is near a sighting reference structure 16. The objective lens, the ocular lens, the optical indicating structure 10 and the sighting reference structure 16 constitute an optical path (not shown) of the aiming apparatus. When a user makes an observation through the aiming apparatus, an object 22, an aiming pattern 20 of the sighting reference structure 16 and a portion of the optical indicating structure 10 are visible within a visual field 18 provided for the user, wherein the boundary of the visual field 18 is represented by a broken line in FIG. 4A.

As shown in FIGS. 3A and 3B, the light guiding element 12 includes a main body 121, two protruding portions 122, two recesses 124, two light exit surfaces 126 (represented by thick lines) and two light incident surfaces 128 (also represented by thick lines). The main body 121 includes an outer edge, an inner circumferential surface 120 and a central axis L, the protruding portion 122 extends from the inner circumferential surface 120 towards the central axis L in a radial direction of the main body 121 (that is, a direction perpendicular to the inner circumferential surface 120), and the recess 124 is formed on the outer edge of the main body 121. The light exit surface 126 is formed on a side of the protruding portion 122 facing the user, and the light incident surface 128 is formed in the recess 124 and is perpendicular to the light exit surface 126. In present embodiment, an opaque layer (not shown) is formed to cover the entirety of the light guiding element 12 except the light incident surface 128 and the light exit surface 126 for shielding a portion of the light guiding element 12 through which light passes is undesired.

As shown in FIG. 3B, the light source 14 is disposed in the recess 124 to emit a light beam (not shown). In present embodiment, the light beam enters the light guiding element 12 through the light incident surface 128, is reflected repeatedly by the opaque layer, leaves the light guiding element 12 from the light exit surface 126, and travels to eyes of the user. The light source 14 may have different operating modes (such as constantly illuminating or intermittently illuminating).

Figure 4A:
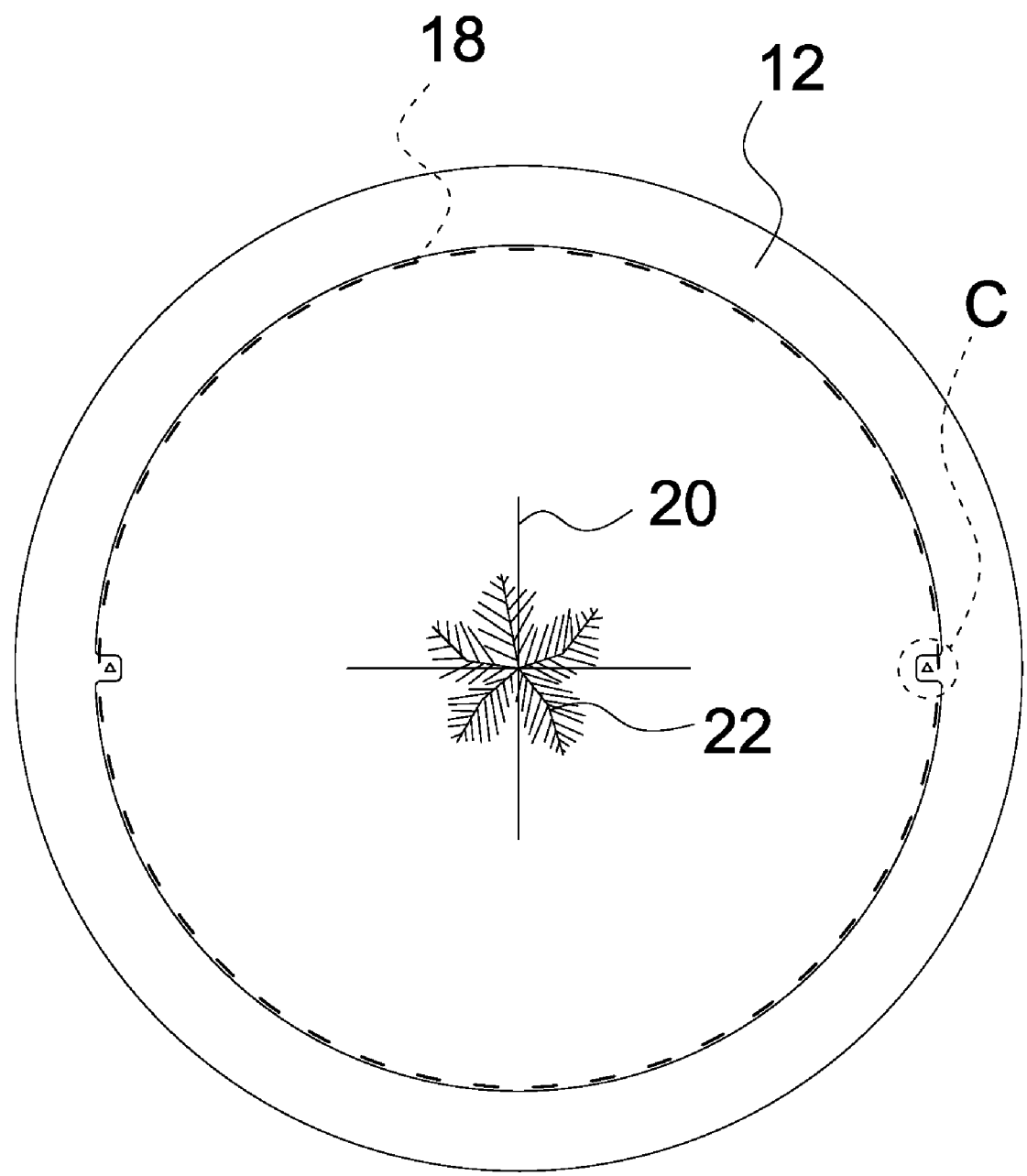
FIG. 4A is a front view of the optical indicating structure of FIG. 3A.
Figure 4B:
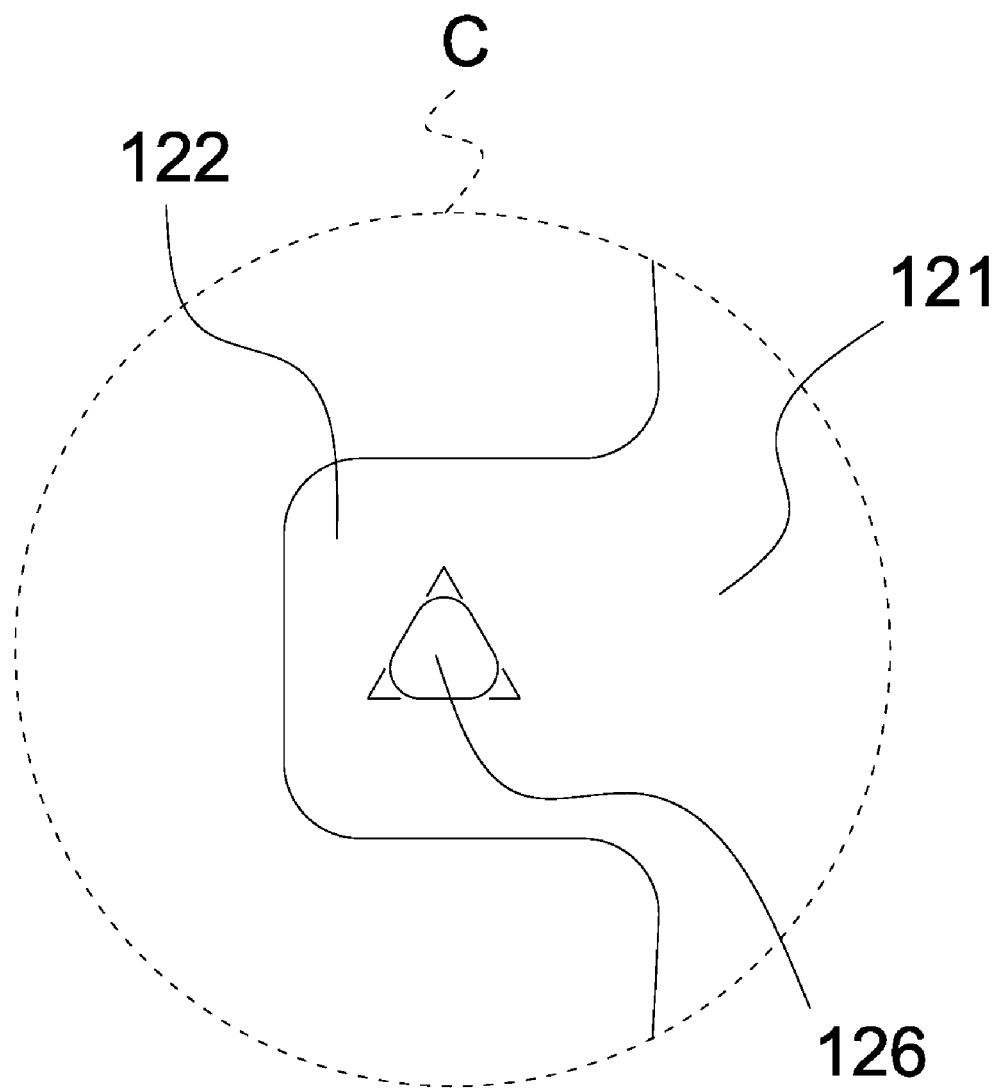
FIG. 4B is an enlarged view of portion C of FIG. 4A.

Referring to FIGS. 4A and 4B, FIG. 4A depicts the optical indicating structure 10 observed by the user facing the light exit surface 126. As described, the protruding portion 122 extends from the inner circumferential surface 120. Therefore, the protruding portion 122 is visible within the visual field 18 for the user. When the light beam leaves the light guiding element 12 from the light exit surface 126 and travels to the eyes of the user, the user feels that the light exit surface 126 illuminates. Moreover, the user can feel that the light exit surface 126 illuminates in different ways when the light source 14 operates in different modes. In other words, when the user makes an observation through the aiming apparatus, the light exit surface 126 of the optical indicating structure 10 and the illumination thereof is visible within the visual field 18. The user can recognize the illumination of the light exit surface 126 for obtaining information corresponding to the illumination, so as to adjust or operate the aiming apparatus.

In another embodiment, the light source 14 emits the light beam at a first frequency or a second frequency, and the second frequency is greater than the first frequency. When the user observes the object 22 in a first position spaced a first distance from a recommended position, the light source 14 emits the light beam at the first frequency. When the user observes the object 22 in a second position spaced a second distance from the recommended position, the light source 14 emits the light beam at the second frequency. The first distance is greater than the second distance, and the second distance is 0.4 to 0.6 times of the first distance. In other words, the smaller the distance between the user and the recommended position, the greater frequency at which the light source 14 emits the light beam (that is, the greater frequency at which the light exit surface 126 illuminates). By recognizing frequency of the illumination, the user can obtain position information thereof for adjusting the aiming apparatus to the recommended position.

In another embodiment, the light source 14 is modified to emit the light beam with a first color or a second color. By recognizing color of the illumination, the user can obtain position information thereof for adjusting the aiming apparatus to the recommended position. In another embodiment, it is worth noting that the light source 14 can be modified to emit the light beam at different frequencies and with different colors so that the light exit surface 126 can illuminate in different ways.

It is worth noting that the light source 14 is not necessarily disposed right behind the protruding portion 122 since the light guiding element 12 is configured to transmit the light beam emitted by the light source 14. For example, the light source 14 of the FIG. 3A is substantially disposed at the outer edge of the light guiding element 12 rather than is disposed right behind the protruding portion 122. Referring to FIG. 5, FIG. 5 depicts a half spherical region D which is determined by taking a center of the light incident surface 128 to be the sphere center of the region D and having a radius of 20 mm. As long as the light source 14 is disposed within the half spherical region D, the light beam will enter the light guiding element 12 through the light incident surface 128 via physical characteristic (such as diffusion, diffraction, refraction or reflection) of the light beam emitted by the light source 14. FIG. 5 further depicts a spherical region E which is determined by taking the center of the light incident surface 128 to be the sphere center of the region E and having a diameter of 10 mm. As long as the light exit surface 126 is disposed within the spherical region E, the attenuation of the light beam due to traveling in the light guiding element 12 can be effectively reduced via material characteristic of the light guiding element 12. Also, the brightness of the light beam can be maintained at a predetermined extent after the light beam entering the light guiding element 12 experiences repeated reflections (specifically, the brightness measured on the light exit surface 126 is greatest within the visual field 18), and the light beam leaves the light guiding element 12 from the light exit surface 126. The light beam leaving from the light exit surface 126 eventually travels to the eyes of the user, so that the user can observe illumination of the light exit surface 126. In another embodiment, the light beam is different in color from the visual field 18, so that the user can observe illumination of the light exit surface 126.

Since arrangement of the light source 14 is flexible, it is not necessary for the protruding portion 122 to shield the light source 14. Therefore, the area of the protruding portion 122 can be reduced. In present embodiment, a ratio of area of the visual field 18 (substantially equals to the area of the prior visual field 7) to the area of the protruding portion 122 (excluding the area of the light exit surface 126) ranges from 400 to 450. More specifically, the ratio is approximately 422.48±5%, in other words, the ratio ranges from 401.356 to 443.604.

Figure 6:
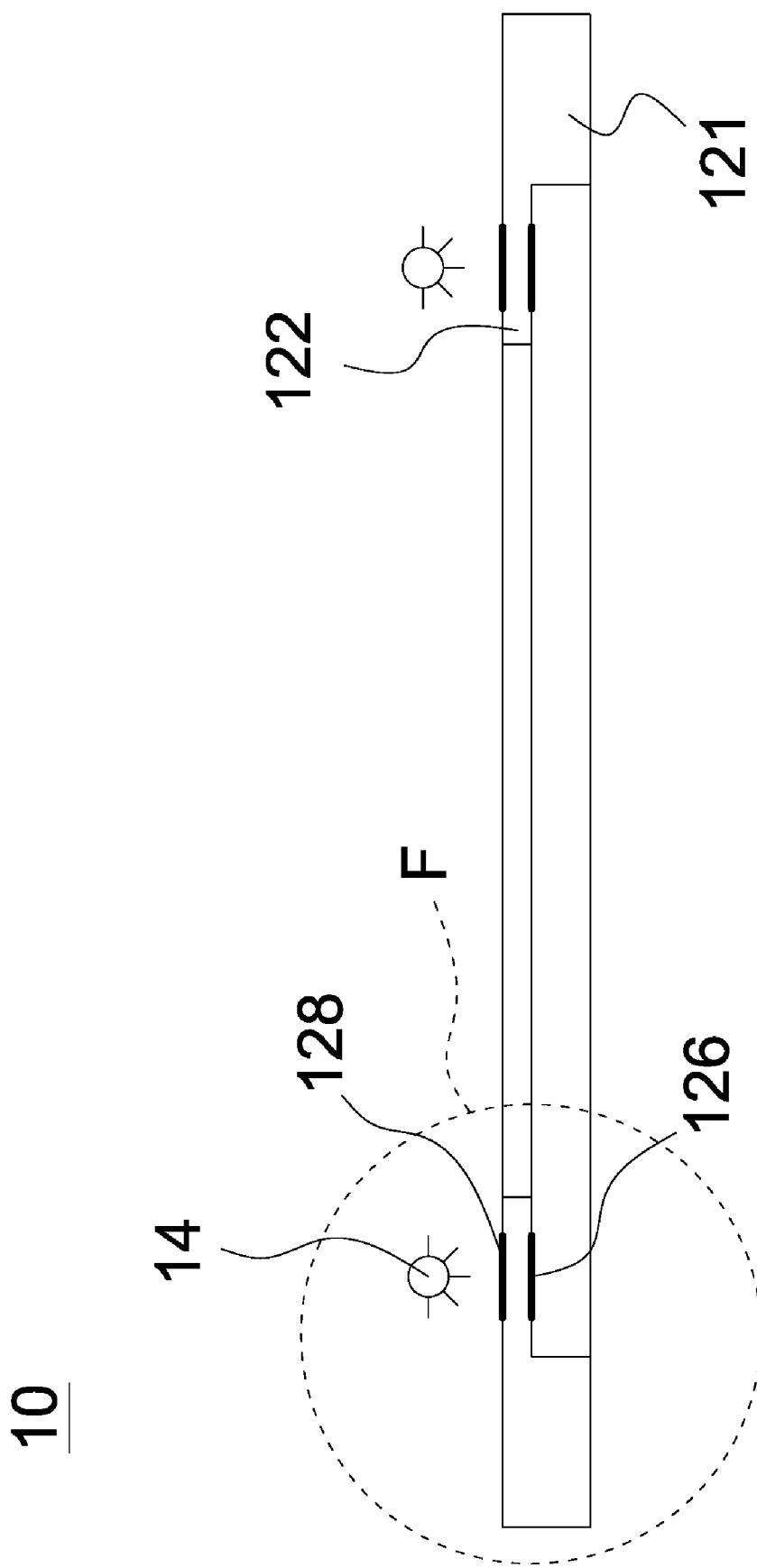
FIG. 6 is a sectional view of an optical indicating structure in accordance with another embodiment of the invention.
Figure 7:
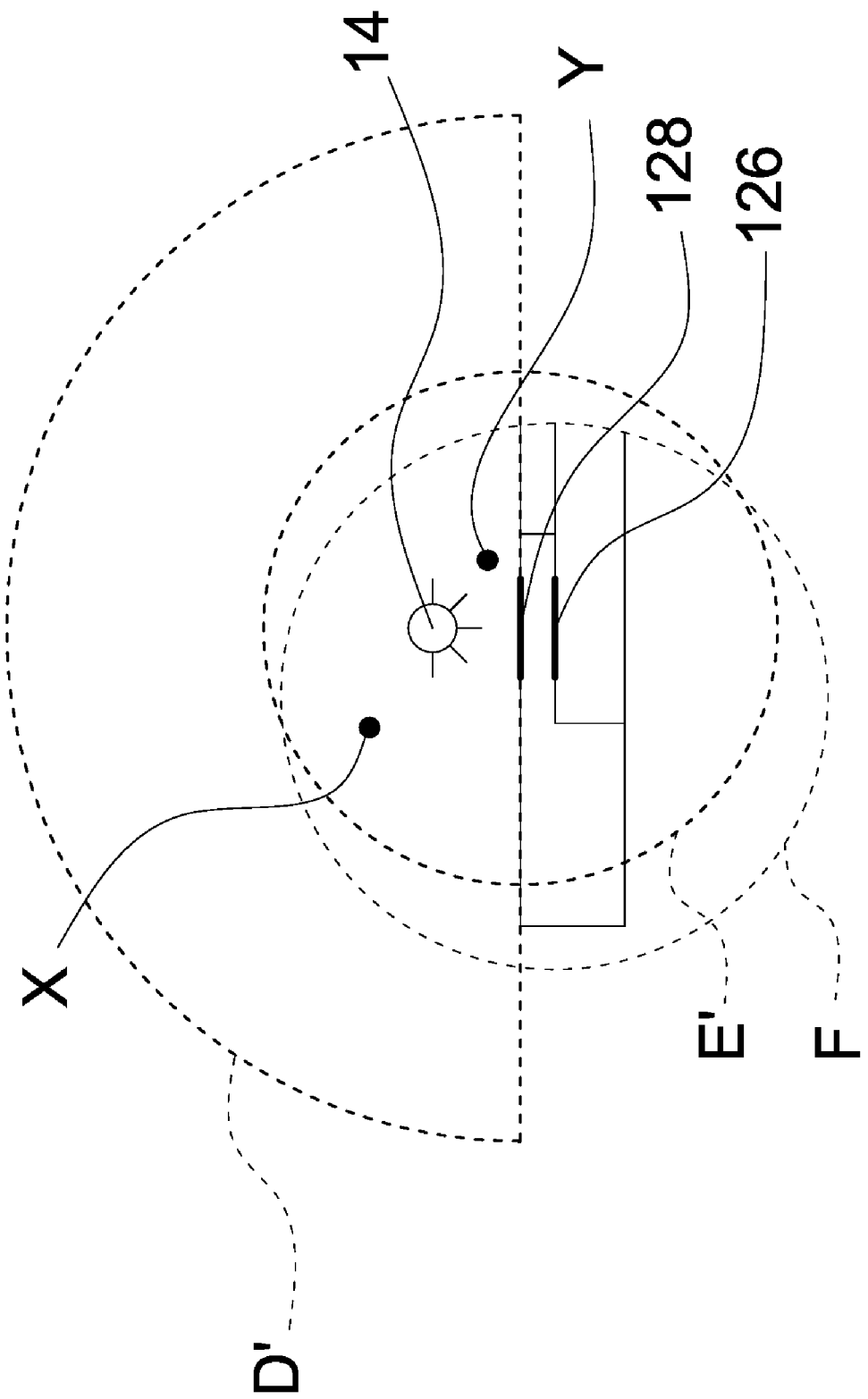
FIG. 7 is an enlarged view of portion F of FIG. 6.

From above description, it is understood that the optical indicating structure 10 can be operated normally as long as the light source 14, the light incident surface 128 and the light exit surface 126 are correctly disposed with respect to each other. Referring to FIG. 6, in another embodiment, the light incident surface 128 is formed on another side of the protruding portion 122 farther from the user (that is, the side opposite to the user) and is parallel to the light exit surface 126. Referring to FIG. 7, the light source 14 is disposed within a half spherical region D' which is determined by taking a center of the light incident surface 128 to be the sphere center of the region D' and having a radius of 20 mm, so that the light beam emitted by the light source 14 can enter the light guiding element 12 through the light incident surface 128. The light exit surface 126 is disposed within a spherical region E' which is determined by taking the center of the light incident surface 128 to be the sphere center of the region E' and having a diameter of 10 mm, so that the light beam leaving the light guiding element 12 from the light exit surface 126 has a predetermined brightness which is greatest within the visual field 18 and the user can observe illumination of the light exit surface 126. The arrangement of other elements and operation are similar to those of the above embodiment, and therefore the descriptions thereof are omitted.

As shown in FIG. 7, in another embodiment, the light source 14 is disposed in a position X (represented by a black bold dot) or a position Y (represented by another black bold dot) in addition to the position shown in FIG. 7. In detail, the above-mentioned half spherical region D' can be represented by a half circle with a central angle of 180 degrees due to an orthographic projection on the paper sheet of FIG. 7. If an angle from a reference direction (towards the left) is defined as 0 degrees, then the position X is at an angle between 40 and 80 degrees and the position Y is at another angle between 135 and 175 degrees. In other words, the light source 14 can be disposed in other positions in addition to right behind the light incident surface 128, as long as the light source 14 is disposed within the half spherical region D'. Such a requirement ensures that the light beam emitted by the light source 14 can enter the light guiding element 12 through the light incident surface 128.

The optical indicating structure 10 of the invention includes the light guiding element 12 disposed therein, so that the light source 14 is not necessarily disposed right behind the protruding portion 122. Therefore, the area of the protruding portion 122 can be reduced, and the components and the manufacturing cost of the optical indicating structure 10 can be also reduced.

What is claimed is:

1. An optical indicating structure, comprising:
a light guiding element comprising a protruding portion, a light exit surface and a light incident surface, wherein the light exit surface is formed on the protruding portion;
a light source configured to emit a light beam, wherein the light beam enters the light guiding element through the light incident surface and leaves the light guiding element through the light exit surface to be an indicating sign; and
an opaque layer which is formed to cover an entirety of the light guiding element except the light incident surface and the light exit surface.

2. The optical indicating structure as claimed in claim 1, wherein the light guiding element further comprises a main body, the protruding portion extends from an inner circumferential surface of the main body, and the light incident surface is formed on the main body.

3. The optical indicating structure as claimed in claim 2, further comprising an opaque layer which is formed to cover an entirety of the light guiding element except the light incident surface and the light exit surface.

4. The optical indicating structure as claimed in claim 2, wherein the light guiding element further comprises a recess formed on the main body, and the light incident surface is formed in the recess.

5. The optical indicating structure as claimed in claim 4, wherein the light source is disposed in the recess.

6. The optical indicating structure as claimed in claim 1, wherein the protruding portion is visible within a visual field when the optical indicating structure is observed in a direction towards the light exit surface.

7. An optical indicating structure comprising:
a light guiding element comprising a protruding portion, a light exit surface and a light incident surface, wherein the light exit surface is formed on the protruding portion; and
a light source configured to emit a light beam, wherein the light beam enters the light guiding element through the light incident surface and leaves the light guiding element through the light exit surface to be an indicating sign,
wherein the light exit surface is formed within a spherical region which has a predetermined diameter and a sphere center coinciding with a center of the light incident surface, to maintain brightness of the light beam at a predetermined extent after the light beam is repeatedly reflected within the light guiding element and to ensure that the light beam leaves the light guiding element through the light exit surface.

8. The optical indicating structure as claimed in claim 7, wherein a visual field is visible when the optical indicating structure is observed in a direction towards the light exit surface, and the light beam is different in color from the visible field.

9. The optical indicating structure as claimed in claim 1, wherein the light source is disposed within a half spherical region which has a predetermined radius and a sphere center coinciding with a center of the light incident surface, to ensure that the light beam enters the light guiding element from the light incident surface.

10. The optical indicating structure as claimed in claim 1, wherein the light source emits the light beam at a first frequency or a second frequency so that the light beam, when leaving the light guiding element, is configured to be a first indicating sign or a second indicating sign different from the first indicating sign.

11. The optical indicating structure as claimed in claim 1, wherein the light source emits the light beam with a first color or a second color so that the light beam, when leaving the light guiding element, is configured to be a first indicating sign or a second indicating sign different from the first indicating sign.

12. The optical indicating structure as claimed in claim 1, wherein a visual field is visible when the optical indicating structure is observed in a direction towards the light exit surface, and a ratio of area of the visual field to area of the protruding portion ranges from 400 to 450.

13. An optical indicating structure, comprising:
an ocular lens;
an objective lens;
a light guiding element disposed between the ocular lens and the objective lens, wherein the ocular lens, the light guiding element and the objective lens constitute an optical path, the light guiding element comprises a main body, a protruding portion, a light exit surface and a light incident surface, the main body comprises an inner circumferential surface surrounding a space, the space is disposed in the optical path, and the light exit surface is formed on the protruding portion; and
a light source configured to emit a light beam, wherein the light beam enters the light guiding element through the light incident surface, leaves the light guiding element from the light exit surface and travels towards the ocular lens to be an indicating sign.

14. The optical indicating structure as claimed in claim 13, wherein the protruding portion extends from the inner circumferential surface, the light incident surface is formed on the main body and is not parallel to the optical path, and the optical path is parallel to a direction in which the light beam leaves from the light exit surface.

15. The optical indicating structure as claimed in claim 13, further comprising an opaque layer which is formed to cover an entirety of the light guiding element except the light incident surface and the light exit surface.

16. The optical indicating structure as claimed in claim 14, further comprising an opaque layer which is formed to cover an entirety of the light guiding element except the light incident surface and the light exit surface.

17. The optical indicating structure as claimed in claim 13, wherein the protruding portion is visible within a visual field when the optical indicating structure is observed in a direction towards the light exit surface.

18. The optical indicating structure as claimed in claim 13, wherein the light exit surface is formed within a spherical region which has a predetermined diameter and a sphere center coinciding with a center of the light incident surface, to maintain brightness of the light beam at a predetermined extent after the light beam is repeatedly reflected within the light guiding element and to ensure that the light beam leaves the light guiding element through the light exit surface.

19. The optical indicating structure as claimed in claim 13, wherein the light source is disposed within a half spherical region which has a predetermined radius and a sphere center coinciding with a center of the light incident surface, to ensure that the light beam enters the light guiding element from the light incident surface.

* * * * *